United States Patent [19]

Helling et al.

[11] 4,379,838

[45] Apr. 12, 1983

[54] PHOTOSENSITIVE PHOTOGRAPHIC RECORDING MATERIAL COMPRISING A DYED LAYER

[75] Inventors: Günter Helling, Cologne; Hans Öhlschläger, Bergisch-Gladbach; Wolfgang Himmelmann, Leverkusen; Manfred Beck, Odenthal, all of Fed. Rep. of Germany

[73] Assignee: Agfa-Gevaert Aktiengesellschaft, Leverkusen, Fed. Rep. of Germany

[21] Appl. No.: 308,521

[22] Filed: Oct. 5, 1981

Related U.S. Application Data

[63] Continuation of Ser. No. 196,933, Oct. 14, 1980, abandoned.

[30] Foreign Application Priority Data

Oct. 16, 1979 [DE] Fed. Rep. of Germany ....... 2941819

[51] Int. Cl.³ .............................................. G03C 1/84
[52] U.S. Cl. .................................... 430/518; 430/213; 430/371; 430/536; 430/537; 430/941
[58] Field of Search ............... 430/518, 941, 213, 371, 430/536, 537

[56] References Cited

U.S. PATENT DOCUMENTS

| | | | |
|---|---|---|---|
| 2,882,156 | 4/1959 | Minsk | 430/518 |
| 3,429,839 | 2/1969 | Franco | 430/518 |
| 3,709,690 | 1/1973 | Cohen et al. | 430/518 |
| 3,756,819 | 9/1973 | Sinclair et al. | 430/371 |
| 3,788,855 | 1/1974 | Cohen et al. | 430/578 |

*Primary Examiner*—Jack P. Brammer
*Attorney, Agent, or Firm*—Connolly and Hutz

[57] ABSTRACT

Addition polymers containing at least 10 mole % of recurring structural units of formula I are useful mordants for acid dyes which preferably contain at least two sulfo groups. The polymers can be used together with the dyes in dyed layers of photographic recording materials, such as in antihalo or filter layers.

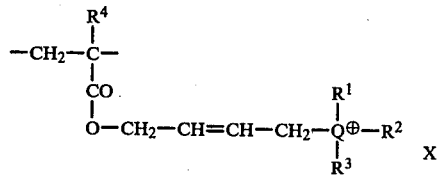

in which
  Q represents N or P;
  $R^1$, $R^2$, $R^3$ represent alkyl or carbocyclic radicals or two of $R^1$, $R^2$ and $R^3$ complete a 5- or 6-membered heterocyclic ring,
  $R^4$ represents H or alkyl,
  $X^\ominus$ represents an anion.

5 Claims, No Drawings

PHOTOSENSITIVE PHOTOGRAPHIC RECORDING MATERIAL COMPRISING A DYED LAYER

CROSS-REFERENCE TO RELATED APPLICATION

This application is a continuation of application Ser. No. 196,933 filed Oct. 14, 1980 for Photosensitive Photographic Recording Material Comprising a Dyed Layer, now abandoned.

This invention relates to a photographic recording material comprising a support layer, at least one photosensitive silver halide emulsion layer applied thereto and at least one other layer which contains a mordant, consisting of a polymer, for acid dyes and at least one acid dye.

It is known to use polymeric mordants for acid dyes in photographic layers. It is possible in this way, either to fix diffusing acid dyes (image receiving layer) or further to improve resistance to diffusion in the case of acid dyes or even other photographically active compounds having only a minimal tendency towards diffusion. In this context, photographic layers may be, quite generally, photosensitive layers, for example silver halide emulsion layers, or even non-photosensitive layers, for example adhesive layers, intermediate layers, filter layers, antihalation layers and surface layers.

Dyed layers which may be decoloured during development are frequently used in photographic recording materials. Thus, it is standard practice to provide the back of roll films and flat films with dyed gelatin layers. These layers are intended not only to reduce the tendency of the film towards curling, but also to absorb as much as possible of the radiation which is not absorbed by the emulsion layers during exposure, in order to prevent the scattering of light within the layers and hence to prevent the formation of a reflection halo. A further improvement may be obtained by arranging the dyed layer not on the back of the support, but instead immediately below the lowermost emulsion layer, so that no scattering of light can occur even on the film support.

In some cases, it is also necessary to coat the emulsion layer with a dye layer in order in this way to keep undesirable radiation away from the emulsion. Thus, particular importance is attributed for example to the filter layers in multiple-layer colour photographic recording materials, for example to a yellow filter layer below a blue-sensitive layer in order to protect the underlying layers which, although sensitized to green or red light, as the case may be, are inherently sensitive to blue light, against blue light. It is also known that sharpness and the reproduction of green can be improved in the region of heavy exposure by arranging a filter layer containing a dye absorbing green light between a green-sensitised layer and an underlying red-sensitised layer.

The dyes used in antihalation or filter layers have to satisfy numerous requirements. For example, they are required to have good absorption properties and to be capable of being completely and irreversibly bleached out in the usual photographic baths. They are also required to be readily soluble or dispersible so that they may be introduced into the layers in adequate concentration without at the same time being fixed in the layer to such an extent that they are unable to diffuse into adjacent emulsion layers. Resistance to diffusion is also a requirement which the dyes in the layer arranged on the back of the support have to satisfy because this layer can also come into close contact with the emulsion layer, for example in the case of roll films or in the case of flat films arranged one on top of the other. The resistance of the dyes to duffusion must be guaranteed under even extreme conditions, such as high temperature and humidity levels.

In order to introduce anionic organic compounds, particularly acid dyes, into the layer in diffusion-resistant form, it has already been proposed to add guanidines, polymers containing amino groups and similar basic compounds to the gelatin solutions of the dyes or to fix the dyes by introducing relatively long fatty residues into the dye molecule. However, methods such as these generally reduce the solubility of the dyes and hence complicate their introduction into the layers or alternatively the bleachability of the layers is seriously impaired or, for example in cases where long-chain quaternary ammonium salts are used as mordants for acid dyes, an unacceptable fog is produced in the adjacent emulsion layers.

Polymeric mordants for acid compounds are described, for example in German Pat. No. 928,268, in U.S. Pat. No. 2,882,156 and in German Offenlegungsschriften Nos. 2,113,381; 2,200,063 and 2,315,304. However, these mordants are not satisfactory in every respect, because they either tend to flocculate, increase the viscosity of the casting solution to an undesirable extent, are incapable of adequately fixing the dyes or, alternatively, fix them so firmly that the layers cannot be bleached during photographic processing. In addition, they frequently have an undesirable influence upon the photographic properties, particularly of the photosensitive layers, which is presumably attributable to their content of low molecular weight constituents which, in many cases, can only be removed with difficulty.

The object of the present invention is to provide new mordants for acid dyes which are suitable for use in photographic filter layers and antihalation layers. It has now been found that the polymeric mordants described in the following may be used with advantage anywhere where acid dyes have to be mordanted. They are particularly suitable for use as mordants for acid dyes in antihalation and filter layers.

The present invention relates to a photographic recording material comprising a support layer, at least one photosensitive silver halide emulsion layer applied thereto and at least one other layer which contains a mordant, consisting of a cross-linked polymer, for acid dyes and at least one acid dye, characterised in that it contains, as mordant, a polymer containing at least 10 mole percent of recurring units corresponding to formula (I) below

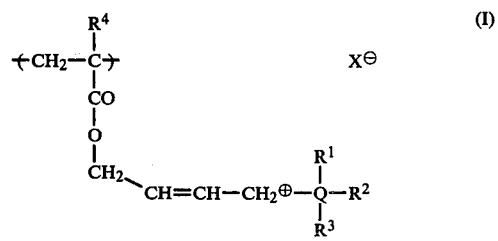

in which
Q is a nitrogen or phosphorus atom;

$R^1$, $R^2$ and $R^3$, which may be the same or different, each represent a carbocyclic radical or an alkyl radical or two of these radicals may together complete a 5-membered or 6-membered heterocyclic ring, $R^4$ represents hydrogen or alkyl, and $X^\ominus$ represents a photographically inert anion.

The recurring units corresponding to formula I above are referred to in the following by the symbol A.

Alkyl radicals which are represented in formula I by $R^1$, $R^2$ and $R^3$ are straight- or branched-chain and normally contain from 1 to 12 carbon atoms. Examples of alkyl radicals such as these are methyl, ethyl, propyl, isobutyl, pentyl, hexyl, heptyl and dodecyl.

Where $R^1$, $R^2$ and $R^3$ in formula I represent carbocyclic radicals, the carbocyclic radicals in question may be cycloalkyl, aralkyl or aryl radicals preferably containing from 5 to 12 carbon atoms, which may be substituted, for example with halogen, nitro, cyano, alkyl, alkoxy, alkylthio or alkoxy carbonyl in which the alkyl preferably contains from 1 to 4 carbon atoms; examples of such unsubstituted and substituted carbocyclic radicals are cyclopentyl, cyclohexyl, benzyl, p-methyl benzyl, chlorobenzyl, nitrobenzyl, cyanobenzyl, methoxy benzyl, methoxy carbonyl benzyl, ethylthiobenzyl, phenyl and tolyl.

Examples of 5-membered or 6-membered heterocyclic rings completed by two of the radicals $R^1$, $R^2$ and $R^3$ are the pyrrolidine, piperidine and morpholine rings.

The alkyl radical represented by $R^4$ is preferably a methyl group.

$X^-$ is a photographically inert anion, for example a halide ion, for example bromide or chloride, or a sulphate, alkyl sulphate, alkyl or aryl sulphonate ion, for example p-toluene sulphonate, or an acetate, phosphate or dialkyl phosphate ion.

The polymer according to the invention preferably contains recurring units corresponding to formula II below:

(II)

in which

A is a defined above, and

V represents the residue of a polymerised monomer containing at least two polymerisable ethylenically unsaturated residues, for example vinyl residues;

M represents the residue of a polymerised monomer containing one polymerisable ethylenically unsaturated residue;

x, y and z represent the figures characterising the proportion of the individual comonomers in the polymer such that x stands for 10 to 99 mole percent y stands for 0 to 90 mole percent and z stands for 0 to 5 mole percent.

Particularly advantageous polymers for producing the mordant layers are those corresponding to formula II in which V is the residue of a monomer, polymerisable by addition polymerisation, which contains at least two ethylenically unsaturated residues and which corresponds to formula III below

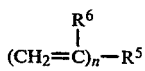
(III)

in which n is an integer greater than 1, preferably 2, 3 or 4, $R^5$ represents an n-valent organic radical and $R^6$ is a hydrogen atom or a methyl radical, $R^5$ may for example represent an organic radical with two or more bonds which is made up of alkylene, arylene, aralkylene, cycloalkylene groups (or, in the case of organic radicals containing more than two bonds, of the corresponding multiple-bond analogs of the abovementioned groups), also ester, sulphonyl ester, amide, sulphonamide groups, ether-oxygen and thioethersulphur atoms and also combinations of the abovementioned groups and atoms.

$R^5$ may represent for example a methylene-; ethylene-; trimethylene-; phenylene-; phenylene dioxy carbonyl-; 4,4'-isopropylidene bis-phenylene oxycarbonyl-; methylene oxycarbonyl-; ethylene dioxy carbonyl-; 1,2,3-propane-triyl-tris-(oxycarbonyl)-; cyclohexylene-bis-(methylene-oxycarbonyl)-; ethylene-bis-(oxyethylene-oxycarbonyl)- or ethylidine trioxy carbonyl group. It is preferred to select monomers of the type which are stable and not particularly reactive in the presence of strong alkali, so that no hydrolysis occurs during copolymerisation.

The following are examples of monomers from which the units (V) may be formed: divinyl benzene; allyl acrylate; allyl methacrylate; N-allyl methacrylamide; 4,4'-isopropylidene diphenyl diacrylate; 1,3-butylene diacrylate; 1,3-butylene dimethacrylate; 1,4-cyclohexylene dimethylene dimethacrylate; diethylene glycol dimethacrylate; diisopropylene glycol dimethacrylate; ethylene diacrylate; ethylene dimethacrylate; ethylidene diacrylate; 1,6-diacrylamidohexane; 1,6-hexamethylene diacrylate; 1,6-hexamethylene dimethacrylate; N,N'-methylene-bis-acrylamide; neopentyl glycol dimethacrylate; tetraethylene glycol dimethacrylate; tetramethylene diacrylate; tetramethylene dimethacrylate; 2,2,2-trichloroethylidene dimethacrylate; triethylene glycol diacrylate; triethylene glycol dimethacrylate; ethylidine trimethacrylate; 1,2,3-propane triyl triacrylate; vinyl methacrylate; 1,2,4-trivinyl cyclohexane or tetra-allyloxy ethane.

Particularly advantageous monomers for the production of units (V) are trivinyl cyclohexane, divinyl benzene, tetra-allyl oxyethane and 1,4-butylene dimethacrylate. Two or more of the abovementioned monomers may also be used alongside one another for the production of units (V) of the polymers according to the invention.

A variety of monoethylenically unsaturated monomers copolymerisable with the remaining monomers may be used for producing the units (M). Monomers containing conjugated ethylenically unsaturated bonds may also be used in this case. Typical suitable monomers (M) are ethylene; propylene; 1-butene; 4-methyl-1-pentene; styrene; α-methyl styrene; monoethylenically unsaturated esters of aliphatic acids, for example vinyl acetate, isopropenyl acetate, allyl acetate and the like; esters of ethylenically unsaturated monocarboxylic and dicarboxylic acids, for example methyl methacrylate, ethyl acrylate, glycidyl acrylate, glycidyl methacrylate, butyl acrylate, also other monoethylenically unsaturated compounds such as, for example, acrylonitrile, allyl cyanide and certain conjugated dienes, for example butadiene, isoprene and 2,3-dimethyl butadiene.

The units (V) are preferably present in a proportion of from 1.0 to 5.0 mole percent, the units (M) in a proportion of from 0 to 45 mole percent and the units containing the ω-substituted buten-2-yl-(meth)acrylate radical (A) according to the invention in a proportion of from 40 to 99 mole percent.

The polymers used in accordance with the invention may be produced by standard emulsion polymerisation processes, for example by the emulsion polymerisation of a 4-halogen butenyl methacrylate with a polyunsaturated monomer (V) and a monoethylenically unsaturated monomer (M), preferably in the presence of an anionic surface-active compound, for example sodium lauryl sulphate, or in the presence of the sodium salt of a sulphonated condensate of an alkyl phenol/ethylene oxide condensate (for example Alipal, a product of the General Dyestuff Corp., U.S.A.) and the like and also preferably in the presence of a radical former or radical initiator, for example in the presence of an initiator forming free radicals of the redox type, for example in the presence of potassium persulphate-sodium bisulphite; potassium persulphate-$Fe^{2+}$ or $H_2O_2$-$Fe^{2+}$. The processes used may for example be processes of the type described in U.S. Pat. No. 3,072,588.

The polymer-4-halogen butenyl methacrylate latex formed in this process may be reacted with a tertiary amine or tertiary phosphine corresponding to the following formula

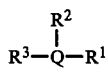

in which $R^1$, $R^2$, $R^3$ and Q are as defined above, preferably at temperatures in the range from about −20° C. to about 150° C. A polymeric microgel latex is obtained.

The 4-halogen butenyl (meth)acrylates required as starting compound are known, for example from U.S. Pat. No. 3,255,163. They may be obtained for example by transesterifying methyl(meth)acrylate with 4-halogen-2-buten-1-ol. Another process for producing the above-mentioned monomers is described in German Offenlegungsschrift No. 2 827 323. The monomers thus obtained are either polymerised directly to form the poly-4-halogen butenyl (meth)acrylate which is then quaternised, or alternatively they are first quaternised and the monomeric quaternary salts thus obtained are subsequently polymerised with the monomers (M) and (V) in the presence of a radical former. In the latter cases, the presence of a surface-active compound during polymerisation is possible, but not necessary, because the monomeric ammonium salt has surface-active properties. Without any further reaction, the polymer latex formed contains an adequate number of cationic units which are necessary for the mordant effect. It is also possible initially to quaternise the 4-chlorobutenyl monomer in part only and to polymerise the quaternisation product (a mixture of quaternised and non-quaternised monomers), after which quaternisation may be continued with the same amine or phosphine or with another amine or phosphine.

Where the polymers are produced in the manner described, a few recurring units corresponding to the following formula

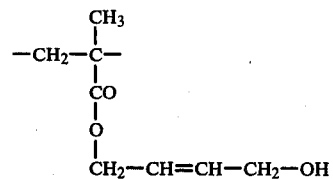

may be formed by hydrolysis of the reactive halogen butenyl methacrylate residues with the liberation of HCl. In addition, the reaction of two reactive halogen butenyl methacrylate residues in the presence of water may produce crosslinks within a latex particle so that the effect of the polyfunctional monomer (V) is strengthened. In some cases, it may even be sufficient not to use a polyfunctional monomer (V) and, instead, to crosslink the latex particle solely through the reaction of the halogen butenyl groups. However, at most up to 5 mole percent of the polymers used in accordance with the invention preferably consist of recurring units formed in the manner described by modification of the halogen butenyl radical.

The water-dispersible polymers used in accordance with the invention generally have a particle size of from about 30 nm to about 400 nm and preferably from 60 to 200 nm.

The polymers used in accordance with the invention may be produced comparatively easily insofar as their production may be carried out in one and the same vessel. There is no need to use relatively large quantities of solvents. The polymers obtainable in the manner described are typically not completely quaternised. In general, the degree of quaternisation amounts to between about 80 and about 100 mole percent.

Accordingly, polymers suitable for use in accordance with the invention may be synthesised for example from:

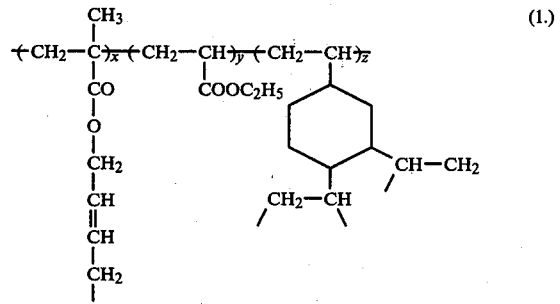

(1.)

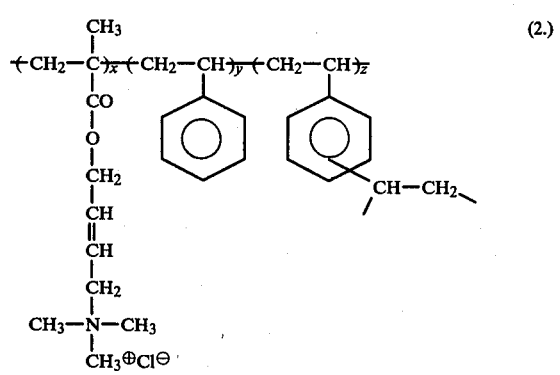

(2.)

-continued

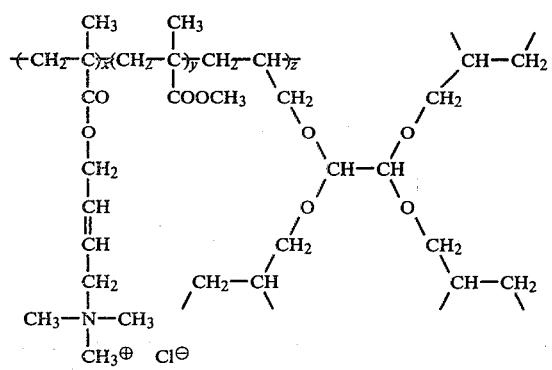
(3.)

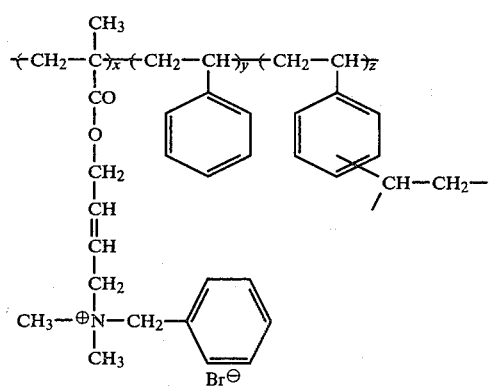
(4.)

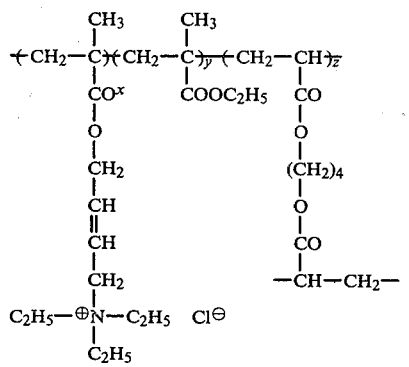
(5.)

The polymers produced by the method described are, in general, sufficiently pure and contain only negligible quantities of impurities. In some cases, however, it may be necessary to purify the polymer dispersions. The known processes of dialysis or ultrafiltration known to the expert are suitable for this purpose. Ionic impurities may even be successfully removed by using mixed-bed ion exchangers which make it possible for the polymers to be completely freed from salts. The polymer dispersions according to the invention may be purified particularly effectively by a flocculation/redispersion process. By acidifying the dispersion, the polymer may be flocculated, separated off as a solid and washed with dilute acids and solvents. The polymer is subsequently redispersed, for example simply by being stirred into water in the neutral to weakly alkaline pH-range.

The purification process described also provides the possibility of drying the polymer after the flocculation and washing process and then isolating and storing it in the form of a powdered solid. It is possible in this way to prevent the bacterial infestation frequently observed in the storage of aqueous dispersions.

For producing the dyed layers according to the invention, the polymers obtained are generally employed in latex form. They may be used in the form in which they accumulate during production or subsequent purification (if any) or even in the form of a redispersed product where drying has been carried out beforehand. Redispersion in aqueous medium may be carried out remarkably easily, which can presumably be attributed to the large number of polar groups in the polymer. In the production of the dyed layers, the polymers according to the invention are normally mixed with other substances, particularly with hydrophilic colloidal binders and with the acid dye to be mordanted. Suitable binders are the standard known hydrophilic colloids which are generally used for the production of photographic layers, for example, gelatin, colloidal albumin, polysaccharides, cellulose derivatives, synthetic resins, for example polyvinyl compounds, for example polyvinyl alcohol and polyvinyl alcohol derivatives, acrylamide polymers and the like.

The polymers used in accordance with the invention are employed in the usual concentrations, the optimum quantity of mordant being determined in each individual case by the type of binder used, by the mordant itself and by the type and quantity of dye to be mordanted.

The concentration of mordant in the dyed layer which is both necessary and ideal in each individual case may readily be determined by simple tests. The mordant is best used in such a quantity that there are from 2 to 8 equivalents of quaternary ammonium groups for every mole of the dye to be mordanted, which preferably contains two or more sulpho groups. Based on the total solids content of the dyed layer, the mordant is generally used in a quantity of at least 10% by weight. However, this concentration is by no means critical in order that the mordanting effect comes into force. The main function of the binder is to promote the casting properties of the mordant solution and layer formation.

The dyed layers of the recording material according to the invention also contain at least one acid dye as an essential ingredient. The dyes in question are largely dyes of the type known to the expert as antihalation or filter dyes. These dyes are generally soluble in water and preferably contain at least two sulpho groups per molecule. They are distinguished by the fact that they have the required spectral properties and fade out or may be washed out of the layers during the processing of the photographic materials. Examples of dyes such as these are given in the following:

| Dye Number | |
|---|---|
| 1 | 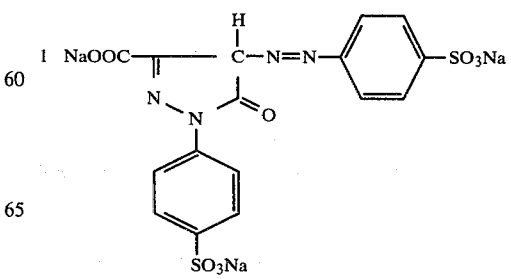 |

-continued
Dye Number
2 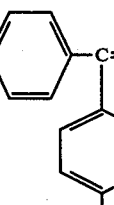
3 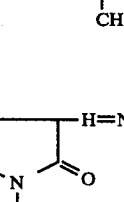
4 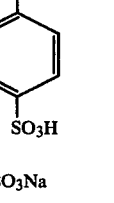
5 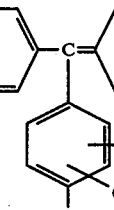
6 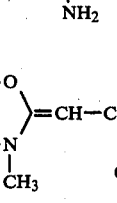
7 
-continued
Dye Number
8 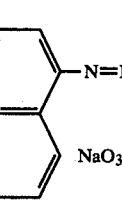
9 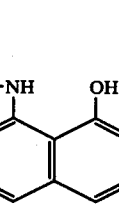
10 
11 
12 
13

| Dye Number | Structure |
|---|---|
| 14 | Anthraquinone with NaO₃S, OH, NH-CH₂-SO₃Na, SO₃Na, NaO₃S-CH₂-NH, OH substituents |
| 15 | H₅C₂O₂C—[pyrazolone]=CH—(CH=CH)₂—[pyrazole]—CO₂C₂H₅, with N-phenyl-SO₃K groups and HO, O substituents |
| 16 | H₃C—[pyrazolone]=CH—CH=C(CH₃)—[pyrazole]—CH₃, with N-phenyl-SO₃Na groups and HO, O substituents |

The dyed layers may also contain a variety of standard known additives, for example UV-absorbers, for example substituted 2-hydroxy phenyl benzotriazoles (Tinuvin) ® and hydroxy benzophenones and the like, also oxidation inhibitors, for example t-butyl hydroxy anisole, butylated hydroxy toluene, substituted chromanols and the like. Where the additives in question are soluble in organic solvents, they are preferably used in the form of an emulsion in aqueous medium.

The mordants used in accordance with the invention may be employed for the production of a variety of photographic materials having a mordant layer by means of which acid dyes are to be mordanted.

It is also possible to use one or more of the mordants employed in accordance with the invention either in one layer or in two or more different layers of a photographic material. The mordants used in accordance with the invention may also be used together with other known mordants in the same layer or in different layers of the same material.

The layers dyed in accordance with the invention may be used in any type of photographic recording materials where light of a certain wavelength has to be selectively absorbed. They are equally suitable for use in materials for black-and-white photography and also in colour photographic materials.

In the latter case, it does not matter how the dye image is produced, whether for example by a chromogenic process, by the silver dye bleaching process or by the dye diffusion process.

The mordants according to the invention are distinguished by outstanding properties, namely:

1. They are photographically inert when used in accordance with the invention in photographic materials in the presence of anionic organic compounds, particularly acid dyes; they do not increase development fog, they do not affect sensitivity, they do not affect gradation and do not adversely affect the stability of the halide emulsion.
2. They do not have any undesirable effects upon the physical properties of the photographic materials; in particular, the swellability of gelatin is not adversely affected. In addition, the viscosity of the casting solution is only negligibly increased by addition of the mordants, in addition to which the mordants are compatible with gelatin in virtually unlimited quantities.
3. In contact with anionic organic compounds, they have a surprisingly minimal tendency towards flocculation; even compounds which have the character of anionic wetting agents through the incorporation of groups imparting resistance to diffusion, such as for example colour couplers containing sulpho groups, are compatible with the mordants according to the invention.
4. The mordants make anionic organic compounds resistant to diffusion at a pH-value of from 5 to 8 and, under the development conditions, reversibly release them beyond a pH-value of 10 so that diffusible anionic organic compounds can be completely and easily washed out of the photographic material, whereas diffusion-resistant anionic compounds, such as for example the dye formed from couplers, are re-fixed in finely divided form in the photographic material on completion of alkaline development.
5. In addition, the mordants make it possible for anionic organic compounds to be fixed in such high concentrations that excessive stressing of the hydrophilic colloid layer by the mordants can be avoided.

EXAMPLE 1

Production of polymer A 400 ml of water and 5 g of wetting agent (Triton 770-30%; a product of Rohm and Haas) were heated to 60° C. while nitrogen was passed through. 6 g of a mixture of 38.5 g of 4-chloro-2-butenyl methacrylate (monomer 1), 22.1 g of ethyl acrylate (monomer 2) and 1.45 g of 1,2,4-trivinyl cyclohexane (monomer 3) was then added with stirring. After stirring for 10 minutes at 60° C., 0.6 g of potassium peroxy disulphate and 0.6 g of sodium metabisulphite were added, the remainder of the monomer mixture was added dropwise over a period of 30 minutes and the mixture then stirred for another 2 hours. The latex obtained (polymer A) had a solids content of 12% and was free from sedimented fractions. Polymers B, C, D, E and F were also produced similarly except that monomers 1, 2 and 3 were varied in regard to type and quantity, as can be seen from the following Table 1.

Production of polymer 1

200 g of polymer A having a solids content of 12% were mixed with 40 ml of isopropanol and the resulting mixture was mixed over a period of 15 minutes with a solution of 10.7 g of N,N-dimethyl benzyl amine in 20 ml of isopropanol, followed by stirring for 6 hours at 60° C. The latex obtained was filtered through a paper filter and had a solids content of 8.5%. Polymers 2 to 15 were also similarly produced in the form of latices from polymers A to F and corresponding amines, as shown in Table 2 below.

TABLE 1

| Polymer | Monomer 1 | Mole % | Monomer 2 | Mole % | Monomer 3 | Mole % |
|---|---|---|---|---|---|---|
| A | 4-chlorobutenyl-methacrylate | 49 | ethyl acrylate | 49 | trivinyl cyclohexane | 2 |
| B | 4-chlorobutenyl-methacrylate | 49 | glycidyl methacrylate | 49 | butane diol diacrylate | 2 |
| C | 4-chlorobutenyl-methacrylate | 49 | styrene | 49 | divinyl benzene | 2 |
| D | 4-chlorobutenyl-methacrylate | 60 | methyl methacrylate | 38 | tetraallyl hydroxy ethane | 2 |
| E | 4-chlorobutenyl-methacrylate | 48 | butyl acrylate | 48 | ethane diol dimethacrylate | 4 |
| F | 4-chlorobutenyl-methacrylate | 50 | ethyl acrylate | 50 | — | — |

TABLE 2

| Polymer | Polymer | Amine | Degree of quaternisation [mole %, based on Cl] |
|---|---|---|---|
| 1 | A | N,N—dimethyl benzyl amine | 93 |
| 2 | A | trimethyl amine | 93 |
| 3 | A | trimethyl amine | 90 |
| 4 | B | N,N—dimethyl benzyl amine | 92 |
| 5 | B | triethyl amine | 92 |
| 6 | C | N,N—dimethyl benzyl amine | 90 |
| 7 | C | trimethyl amine | 90 |
| 8 | C | tri-n-propyl amine | 90 |
| 9 | D | N,N—dimethyl benzyl amine | 88 |
| 10 | D | trimethyl amine | 92 |
| 11 | D | triethyl amine | 92 |
| 12 | D | trimethyl amine | 90 |
| 13 | F | trimethyl amine | 93 |
| 14 | F | N,N—dimethyl benzyl amine | 93 |
| 15 | F | N,N—dimethyl-4-chlorobenzyl amine | 90 |

EXAMPLE 2

An aqueous mordant solution is added in the quantities indicated in Table 3 below at 40° C. to quantities of 50 ml of a 10% gelatin solution. The mordant solutions are adjusted to a content of 0.22 equivalents of cationic groups per 1000 ml. Clear or clouded solutions are obtained and are diluted with water to 100 ml. The cationic polyurethane according to German Offenlegungsschrift No. 2,315,304 is added as comparison compound, corresponding to the following formula:

$$\text{+O—CH}_2\text{—CH}_2\text{—N—CH}_2\text{—CH}_2\text{—O—C—NH—R—NH—C+}_{0.9}$$
with $\overset{\oplus}{|}$ C$_4$H$_9$, C$_2$H$_5$SO$_4^\ominus$, and two C=O groups $$\text{+O—CH}_2\text{—CH}_2\text{—N—CH}_2\text{—CH}_2\text{—O—C—NH—R—NH—C+}_{0.1}$$
with C$_4$H$_9$ side group R = 80% —(CH$_2$)$_6$— and 20% 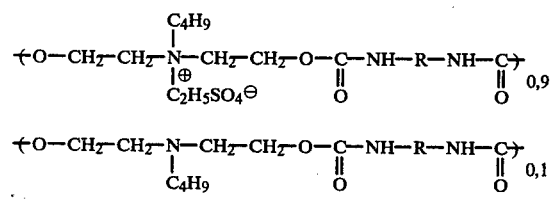

Quantities of 50 ml of an aqueous dye solution are run with intensive stirring into the mordant-containing gelatin solutions, followed by casting at pH 5.5–6.0 by the dip casting process onto a cellulose triacetate support to form a filter layer having a layer thickness of from 2.0 to 2.5 μm.

To test resistance to diffusion, the dye layers are rinsed in running water for 16 hours and their density is determined before and after rinsing. In addition, the materials are subjected to the following colour negative processing:

Colour development:
3¼ minutes at 38° C. in a developer consisting of sodium hexametaphosphate—2 g
sodium sulphite (sicc.)—2.0 g
sodium hydrogen carbonate—8 g
sodium hydrogen sulphate—7 g
potassium bromide—1.8 g
sodium carbonate (sicc.)—30 g
hydroxyl amine sulphate—3 g
4-amino-3-methyl-N-ethyl-N-(β-hydroxyethyl)-aniline—2.6 g Further processing is carried out at 38° C. and comprises the following baths:
bleaching bath—4 minutes 20 seconds
rinsing—1 minute 5 seconds
fixing—4 minutes 20 seconds
rinsing—3 minutes 15 seconds The formulations of the baths used are described in "The British Journal of Photography" July, 1974, pages 597 and 598.

All the gelatin solutions gave clear layers when cast in their fresh state. On digestion at 40° C., the dyes precipitated slowly from the solutions containing the comparison mordants which, after digestion for 5 hours, gave only clouded layers, whereas the dye solutions containing the mordants according to the invention gave clear layers, even after digestion.

The processing results are set out in the following Table.

TABLE 3

| Test-No. | Mordant of polymer No. | ml | Dye No. | mg | Density untreated | Density after rinsing for 16 hours | % |
|---|---|---|---|---|---|---|---|
| 1 | 7 | 16,2 | 1 | 450 | 0,77 | 0,64 | 83 |
| 2 | 6 | " | 1 | " | 0,77 | 0,69 | 89 |
| 3 | 5 | " | 1 | " | 0,76 | 0,69 | 91 |
| 4 | Comparison | " | 1 | " | 0,78 | 0,38 | 49 |
| 5 | 7 | 13,5 | 2 | 400 | 0,82 | 0,82 | 100 |
| 6 | 6 | " | 2 | " | 0,82 | 0,82 | 100 |
| 7 | 5 | " | 2 | " | 0,79 | 0,79 | 100 |
| 8 | Comparison | " | 2 | " | 0,75 | 0,61 | 81 |
| 9 | 7 | 6,6 | 5 | 150 | 0,76 | 0,49 | 64 |
| 10 | 6 | " | 5 | " | 0,82 | 0,70 | 86 |
| 11 | 5 | " | 5 | " | 0,75 | 0,56 | 74 |
| 12 | Comparison | " | 5 | " | 0,79 | 0,02 | 3 |
| 13 | 7 | 8,5 | 11 | 200 | 0,78 | 0,73 | 93 |
| 14 | 6 | " | 11 | 200 | 0,86 | 0,67 | 78 |
| 15 | 5 | " | 11 | " | 0,81 | 0,64 | 84 |
| 16 | Comparison | " | 11 | " | 0,89 | 0,55 | 62 |

The Table shows clearly that, in every case, the mordants according to the invention are superior to the comparison mordants in regard to fixing of the dyes.

After passing through the development processing all of the samples were satisfactorily bleached.

EXAMPLE 3

This Example demonstrates that dyes belonging to a variety of classes can be satisfactorily fixed with the mordants according to the invention. The results are shown in Table 4 below. The casting solution has the same composition as in Example 2.

TABLE 4

| Test No. | Mordant of polymer No. 7 ml | Dye No. | mg | Abs. Max. (nm) | Density a | b | % |
|---|---|---|---|---|---|---|---|
| 17 | 18 | 1 | 450 | 429 | 0,81 | 0,75 | 93 |
| 18 | 16 | 2 | 400 | 438 | 0,78 | 0,78 | 100 |
| 19 | 6,4 | 3 | 200 | 538 | 0,74 | 0,63 | 85 |
| 20 | 6,4 | 4 | 200 | 662 | 0,72 | 0,59 | 83 |
| 21 | 45 | 7 | 900 | 442 | 0,65 | 0,58 | 89 |
| 22 | 31 | 12 | 580 | 515 | 0,72 | 0,72 | 100 |
| 23 | 23 | 13 | 470 | 567 + 533 | 0,95 | 0,83 | 86 |
| 24 | 38 | 14 | 670 | 690 + 638 | 0,83 | 0.83 | 100 |
| 25 | 6,0 | 15 | 250 | 668 | 0,75 | 0,71 | 94 |
| 26 | 8,4 | 16 | 240 | 553 | 0,75 | 0,62 | 83 | a = untreated
b = after rinsing for 16 hours

EXAMPLE 4

The following layers are applied successively to a support layer of cellulose triacetate provided with an adhesive layer. The corresponding quantities of silver nitrate are quoted for the silver coating.

Comparison Material

1. A red-sensitised silver halide emulsion (96% of silver bromide, 4% of silver iodide) containing a cyan coupler corresponding to the following formula silver coating: 1.1 g/m².

2. A gelatin intermediate layer containing per kg of casting solution 3 g of a polymeric white coupler containing recurring units of the following formula 3. A green-sensitised silver halide emulsion (96% of silver bromide, 4% of silver iodide) containing a magenta coupler corresponding to the following formula silver coating: 0.8 g/m².

4. A standard yellow filter layer of a silver sol. The silver sol was obtained in known manner. The colour density of the yellow filter layer, measured behind a blue filter, amounts to 0.6.

5. An unsensitised silver bromide emulsion having an iodide content of 2% and containing a yellow coupler of the following formula silver coating: 1.3 g/m².

Material according to the invention

A material according to the invention is prepared in exactly the same way except that instead of the yellow filter layer described, a yellow filter layer having the same colour density is prepared using mordant 2 according to the invention and dye No. 1. The layer is prepared in the same way as described in Example 2, test No. 1.

After storage for 2 days at 23° C., both materials, i.e. the comparison material and the material according to the invention, are exposed image-wise behind a wedge and subjected to the following processing cycle at 20° C.:

Black-and-white development 7 minutes in a developer consisting of:
distilled water—300 ml
sodium metahexaphosphate—2 g
p-methyl aminophenol—2.3 g
sodium sulphite anhydrous—50 g
hydroquinone—6.6 g
sodium carbonate, anhydrous—50 g
potassium thiocyanate—3.5 g
potassium bromide—1.8 g
potassium iodide—0.008 g
made up with water to 1000 ml; pH=10

Stop bath 5 minutes in a solution of:
distilled water—300 ml
cryst. sodium acetate—30 g
acetic acid—5 ml
made up with water to 1000 ml, pH=5
Intermediate rinsing: 10 minutes
Diffuse reversal exposure: 2 minutes
Colour development: 18 minutes in a colour developer consisting of:
distilled water—300 ml
nitrilotriacetic acid—2 g
N,N-diethyl-p-phenylene diamine—3.5 g trisodium phosphate—20 g
potassium bromide—0.7 g
hydroxy amine—0.8 g
made up with water to 1000 ml, pH=11.7
Intermediate rinsing: 5 minutes
Bleaching: 5 minutes in a bleaching bath consisting of:
  potassium ferricyanide—8 g
  potassium bromide—20 g
  disodium phosphate—12 g
made up with water to 1000 ml and adjusted with acetic acid to pH 5.2.
Intermediate rinsing: 5 minutes
Fixing: 5 minutes in a fixing bath consisting of:
  ammonium thiosulphate—150 g
  sodium sulphite, anhydrous—10 g
  sodium metahexaphosphate—2 g
made up with water to 1000 ml, pH=7
Final rinsing: 5 minutes The data shown in Table II are obtained.

TABLE II

| Sample | Sensitivity | | | Maximum density | | |
|---|---|---|---|---|---|---|
| | yellow | magenta | cyan | yellow | magenta | cyan |
| comparison sample | 18.4 | 18.6 | 19.8 | 2.98 | 3.09 | 2.80 |
| according to the invention | 18.4 | 20.2 | 20.8 | 3.20 | 3.20 | 2.90 |

An increase in sensitivity of 3 units corresponds to a doubling of sensitivity.

The more favourable properties of the dyes used in accordance with the invention in comparison with silver filter yellow layers are apparent from the increase in sensitivity and the simultaneous increase in maximum density. There is no difference between the yellow fog values of both materials, i.e. the dye used in accordance with the invention was completely washed out during processing.

We claim:

1. In a photographic recording element, comprising a layer support, at least one layer comprised of photosensitive silver halide emulsion supported on said layer support, and at least one other supported layer as a dyed layer containing uniformly distributed therein a polymeric mordant for acid dyes and at least one acid dye, the improvement according to which the mordant in said dyed layer consists essentially of a polymer obtained by addition polymerization and corresponding to the following formula

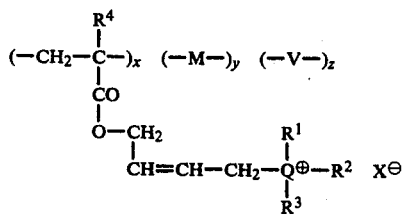

in which

Q is a nitrogen or phosphorus atom;

$R^1$, $R^2$ and $R^3$ are the same or different and represent alkyl radicals of 1 to 12 carbon atoms or carbocyclic radicals selected from the group consisting of cycloalkyl, aralkyl and aryl radicals containing from 5 to 12 carbon atoms, which may be substituted with halogen, nitro, cyano, alkyl, alkoxy, alkylthio or alkoxy carbonyl in which the alkyl contains from 1 to 4 carbon atoms, or two of the substituents $R^1$, $R^2$ and $R^3$ together represent a group necessary for completing a 5- or 6-membered heterocyclic ring selected from the group consisting of pyrrolidine, piperidine or morpholine rings;

$R^4$ represents hydrogen or methyl, $X^\ominus$ represents a photographically inert anion, V represents the residue of a polymerized monomer polymerizable by addition polymerization containing at least two polymerizable ethylenically unsaturated groups; and corresponds to the following formula

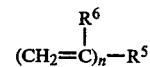

in which n is an integer greater than 1, $R^5$ represents an organic radical with two or more bonds which is made up of alkylene, arylene, aralkylene, cycloalkylene groups, ester, sulphonyl ester, amide, sulphonamide groups, etheroxygen and thioethersulphur atoms and also combinations of the above-mentioned groups and atoms, $R^6$ is a hydrogen atom or a methyl radical, M represents the residue of a polymerized monomer containing one polymerizable ethylenically unsaturated group;

x, y and z represent the figures indicating the proportions of the monomer in the polymer, such that x stands for 10 to 99 mole %, y stands for 0 to 90 mole %, z stands for 0 to 5 mole %.

2. The photographic recording element as claimed in claim 1 wherein $R^1$, $R^2$ and $R^3$ are the same or different and represent methyl, ethyl or benzyl.

3. The photographic recording element as claimed in claim 1 wherein the dye in the dyed layer contains at least two sulfo groups.

4. The photographic recording element as claimed in claim 1 wherein M represents the residue of a polymerized monomer selected from the group consisting of an alkene, a monoethylenically unsaturated ester of aliphatic acid, and an ester of ethylenically unsaturated monocarboxylic and dicarboxylic acids.

5. The photographic element as claimed in claim 1 wherein $R^5$ represents a methylene-; ethylene-; trimethylene-; phenylene-; phenylene dioxy carbonyl-; 4,4'-isopropylidene bis-phenylene oxycarbonyl-; methylene oxycarbonyl-; ethylene dioxy carbonyl-; 1,2,3,-propane-triyl-tris(oxycarbonyl)-; cyclohexylene-bis-(methyleneoxycarbonyl)-; ethylene-bis-(oxyethyleneoxycarbonyl)- or ethylidine trioxy carbonyl group.

* * * * *